(12) United States Patent
Spence (10) Patent No.: US 12,287,752 B2
(45) Date of Patent: Apr. 29, 2025

(54) METHODS AND SYSTEMS FOR SERIAL CONTROL WITH INTERLEAVED REGISTER MAPPING

(71) Applicant: NXP USA, Inc., Austin, TX (US)

(72) Inventor: Nicholas Justin Mountford Spence, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 669 days.

(21) Appl. No.: 17/682,452

(22) Filed: Feb. 28, 2022

(65) Prior Publication Data

US 2023/0273895 A1 Aug. 31, 2023

(51) Int. Cl.
*G06F 13/42* (2006.01)

(52) U.S. Cl.
CPC ...... *G06F 13/4282* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 4,603,322 A * | 7/1986 | Blair | ...................... | H03M 5/12 375/333 |
| 5,878,234 A | 3/1999 | Dutkiewicz et al. | | |
| 7,761,633 B2 | 7/2010 | Devila et al. | | |
| 7,847,803 B1 * | 12/2010 | Van Hook | ............. | G06F 9/3888 718/107 |
| 9,411,770 B2 | 8/2016 | Decesaris et al. | | |
| 9,606,947 B2 | 3/2017 | Ross et al. | | |
| 10,268,614 B2 | 4/2019 | Shahramian et al. | | |
| 11,016,543 B2 | 5/2021 | Filser et al. | | |
| 2016/0117275 A1 * | 4/2016 | Ross | ...................... | G06F 13/362 710/110 |
| 2017/0374490 A1 | 12/2017 | Schoppmeier | | |

FOREIGN PATENT DOCUMENTS

| | | |
|---|---|---|
| CN | 202167015 U | 3/2012 |
| CN | 105335322 B | 7/2018 |

OTHER PUBLICATIONS

U.S. Appl. No. 17/682,447 NFOA dated Apr. 11, 2024, 10 pages.
U.S. Appl. No. 17/682,447 NOA dated Oct. 23, 2024, 10 pages.
Shwetha, S. et al.;"The Design of Multiprotocol Interface Device"; IEEE Xplore; 3 pages (Jul. 2016).

* cited by examiner

*Primary Examiner* — Henry Tsai
*Assistant Examiner* — Dean Phan (57) ABSTRACT

Digitally controllable elements capable of influencing operation of a power amplifier module are coupled in parallel to a serial data interface. Each digitally controllable element includes address control logic that decodes an address presented on the serial data interface as well as a device specific ID. In response to the decoding, physical registers in different digitally controllable elements are written in an interleaved order according to an interleaved register address map. Banks of registers within the digitally controllable elements may be select to influence or modify operation of the power amplifier module.

20 Claims, 9 Drawing Sheets

METHODS AND SYSTEMS FOR SERIAL CONTROL WITH INTERLEAVED REGISTER MAPPING

TECHNICAL FIELD

Embodiments of the subject matter described herein relate generally to serial data communications, and more particularly to register address mapping in serial communications.

BACKGROUND

Many radio frequency (RF) circuits provide for digital control of circuit elements. For example, digitally variable capacitors (DVCs) may be included in RF circuits and capacitance values of the DVCs may be modified under digital control. Digital control may be accomplished using various mechanisms, including digital registers that appear in a processor's memory map, and digital registers that are coupled to a serial bus.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
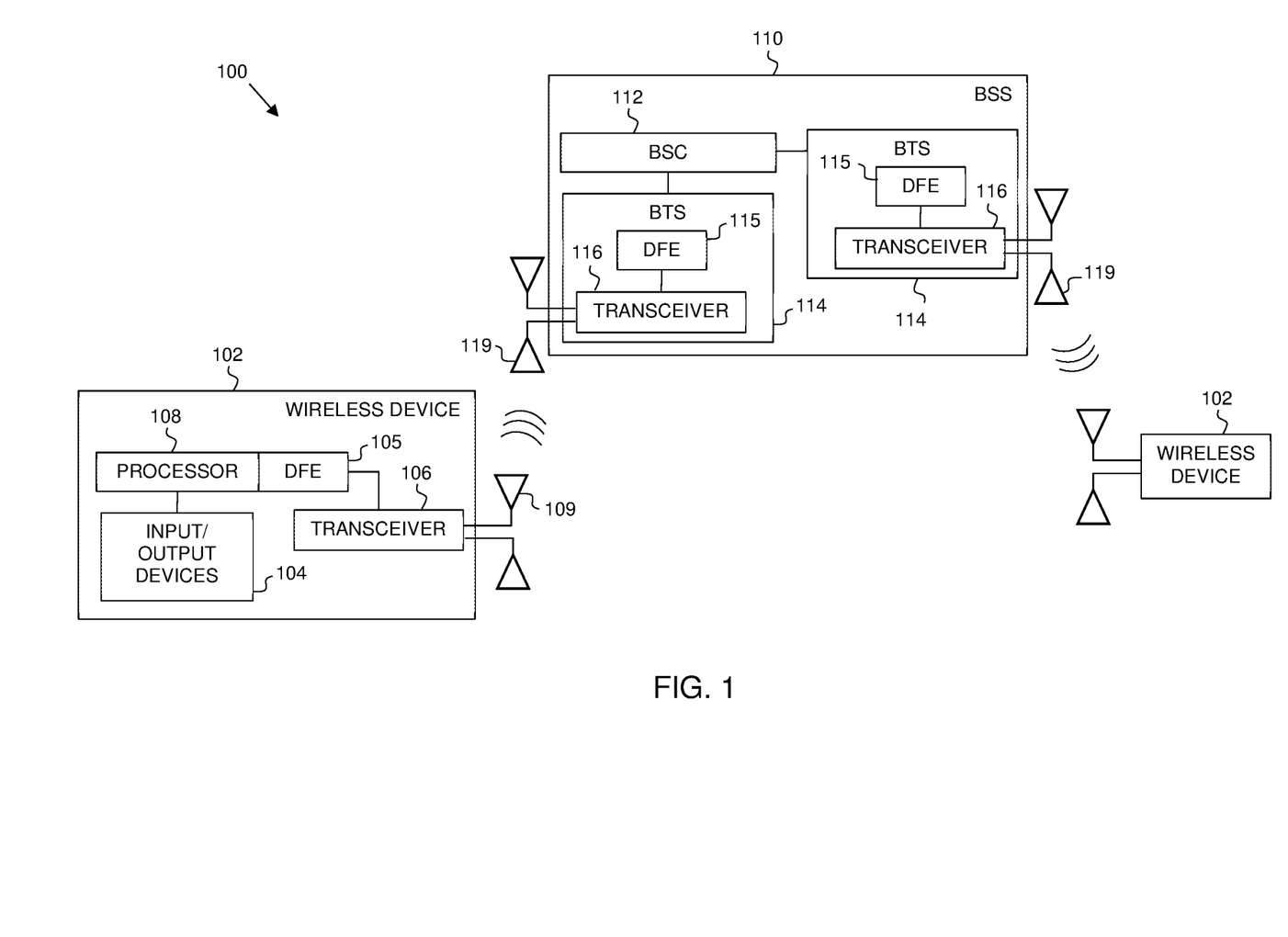
FIG. 1 is a simplified block diagram of a wireless communication system, in accordance with an example embodiment.

FIG. 1 is a simplified block diagram of a wireless communication system 100 that includes one or more base station systems (BSS) 110, and one or more wireless devices 102. Wireless devices 102 may include, for example, subscriber stations (e.g., hand-held computers, Internet of Things (IoT) devices, cellular telephones, etc.) that wirelessly communicate with the one or more BSS 110. BSS 110 may include any radio access network (RAN) node such as, for example, an evolved Node-B or eNB devices of an LTE (Long Term Evolution) network) or any other type of RAN node in any other type of communication network.

As shown in FIG. 1, each wireless device 102 includes a radio frequency (RF) transceiver 106, a digital front end (DFE) 105, a baseband processor 108, input/output (I/O) devices 104, and antenna(s) 109. In operation, DFE 105 communicates data to a radio frequency (RF) transmitter within RF transceiver 106. Baseband processor 108 (e.g., a digital signal processor) is connected through DFE 105 to the RF transceiver 106, which in turn is connected to the one or more antennas 109. The baseband processor 108 and the DFE 105 may be implemented as one or more integrated circuits to provide the digital processing functionality of the wireless device 102. The digital processing components consolidated on the DFE 105 may include one or more control processors and digital transmit/receive filters, as well as interface peripherals and other I/O for RF subsystem functions. In various embodiments, each RF transceiver 106 (including an RF transmitter and an RF receiver) is configured to receive or transmit voice, data, or both voice and data using the antenna(s) 109, and to provide an interface for signals between the antennas 109 and the DFE 105. More specifically, each RF transceiver 106 is configured to perform digital-to-analog conversion and amplification of signals from the DFE 105, and to amplify and perform analog-to-digital conversion of signals received over the air interface by an antenna 109. In addition, each wireless device 102 may include one or more input/output devices 104 (e.g., a camera, a keypad, display, etc.), along with other components (not shown).

The BSS 110 includes a base station controller (BSC) 112 and one or more base transceiver stations (BTS) 114, where each BTS 114 provides a communication interface between the BSC 112 and antennas 119. The BSC 112 may, for example, be configured to schedule communications for the wireless devices 102. Through antennas 109, 119, each wireless device 102 communicates with the BSC 112 of the BSS 110 via one of the BTS 114.

Essentially, each BTS 114 is configured to receive or transmit signals that include processed voice, data, or both voice and data through the antenna(s) 119, and to provide an interface for signals between the antennas 119 and the BSC 112. The BTS(s) 114 each include a DFE 115 which may be implemented as one or more integrated circuits to provide the digital processing functionality of the BTS 114. The digital processing components consolidated on the DFE 115 may include one or more control processors and digital transmit/receive filters, as well as interface peripherals and other I/O for RF subsystem functions. In addition, the BTS(s) 114 each include an RF transceiver 116 (including an RF transmitter and an RF receiver), which is configured to perform digital-to-analog conversion and amplification of signals from the DFE 115, and to amplify and perform analog-to-digital conversion of signals received over the air interface by an antenna 119.

In various embodiments, transceiver 116 includes one or more amplifier modules to amplify signals and transmit resulting RF signals using antenna 119. In some embodiments, the amplifier modules include digital control interfaces to allow control of digitally controllable elements that influence or modify the operation of the amplifier. For example, digitally controllable elements may modify a capacitance value of a digitally variable capacitor (DVC) or may control switches that control the presence of circuit elements such as capacitors, inductors and/or resistors in the amplifier circuit. Also for example, a digitally controllable element may modify the operation of circuit elements that bias amplifiers. In general digitally controllable elements may influence or modify the operation of one or more modules within transceiver 116 in any manner.

Digitally controllable elements may be accessed via one or more digital control interfaces. For example, in some embodiments, an amplifier module may include a serial and/or non-serial interface coupled in parallel to one or more digitally controllable elements, and registers within the digitally controllable elements may be written to, and read from, using the serial interface. In various embodiments, data presented sequentially on the serial interface may be written to registers in different digitally controllable elements in an interleaved sequence in accordance with an interleaved address map. Registers across multiple digitally accessible elements may be logically organized into "banks" such that one bank of registers (including registers in multiple elements) may be written to using sequential data on the serial interface before a second bank of registers (also including registers in the multiple elements) may be written to using sequential data on the serial interface. These and other embodiments are described further below.

As will be appreciated, the digital control of amplifier modules disclosed herein with reference to the base station system 110 may also be used in connection with a wireless communication device, such as the wireless devices 102. To this end, and as mentioned earlier, each wireless device 102 may also include multiple digitally controllable elements that present an interleaved register address map to a serial control interface.

Figure 2:
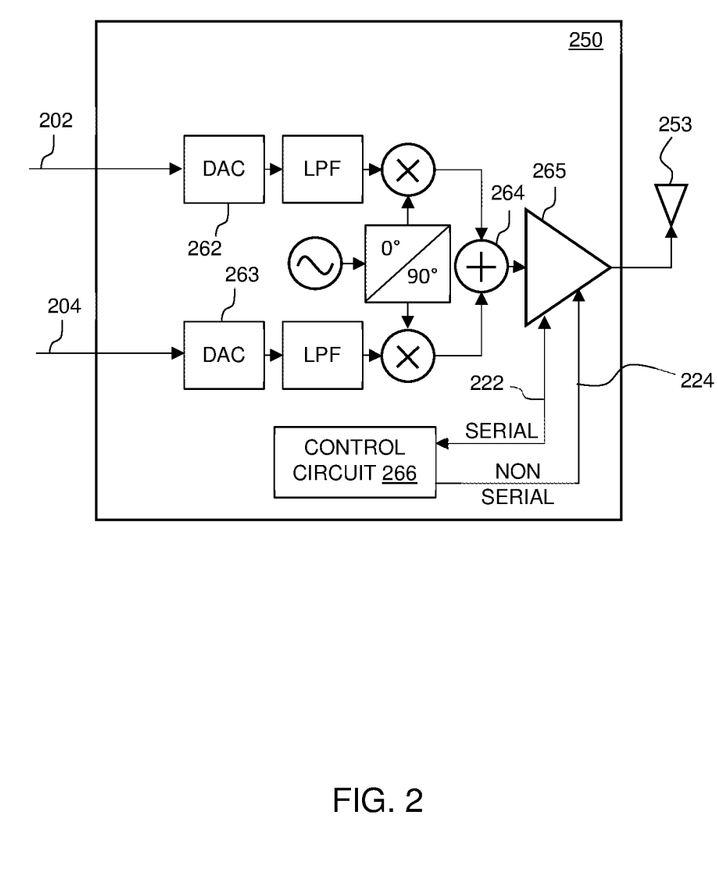
FIG. 2 show a block diagram of an RF transmit front end, in accordance with an example embodiment.

FIG. 2 shows a block diagram of an RF transmit front end, in accordance with an example embodiment. RF transmit front end 250 may be included as a portion of an RF transceiver such as RF transceiver 106 within wireless device 102 or RF transceiver 116 within BSS 110. According to an embodiment, RF transmit front end 250 includes control circuit 266, digital-to-analog converters (DACs) 262, 263, low pass filters (LPFs), an oscillator, mixers, a signal combiner 264, and a power amplifier module 265.

Each DAC 262, 263 includes a circuit for converting a digital sampled data stream to an analog signal. Because the analog signals are converted from a complex data stream, each DAC 262, 263 may be defined as a subblock accepting either the real (I) or the imaginary (Q) component of the data stream. For example, DAC 262 may receive digital samples from a digital front end on node 202, and DAC 263 may receive digital samples from a digital front end on node 204. Each DAC 262, 263 performs a digital-to-analog conversion on each received sample, and the resulting analog samples are filtered (e.g., by an LPF). The oscillator produces an RF sinusoidal signal that is used to upconvert (to RF) the analog I and Q sample streams. The filtered, analog I sample stream is mixed with the RF signal, and the filtered, analog Q sample stream is mixed with a 90 degree delayed version of the RF signal in order to re-align the I and Q sample streams. Combiner 264 then combines the two sample streams and provides a single RF input signal to the power amplifier module 265. Power amplifier module 265 amplifies the RF input signal and produces an amplified RF output signal to be transmitted by antenna 253.

As mentioned above, the power amplifier module 265 may include one or more digitally controllable elements (e.g., circuits 320, FIG. 3; and 410, 420, 430, 440 FIG. 4), the operation of which is controlled using a digital interface such as serial interface 222 or non-serial interface 224. In the example of FIG. 2, RF transmit front end 250 includes control circuit 266 that communicates with amplifier module 265 over one or more digital interfaces 222, 224. In some embodiments, a first bank of registers that spans multiple digitally controllable elements may be written to using data presented sequentially on serial interface 222, and then a second bank of registers that also spans multiple digitally controllable elements may be written to using additional data presented sequentially on serial interface 222. Further, in some embodiments, non-serial interface 224 may then be used to select a bank of registers to influence or modify the operation of the amplifier module 265. These and other embodiments are further described below.

Figure 3:
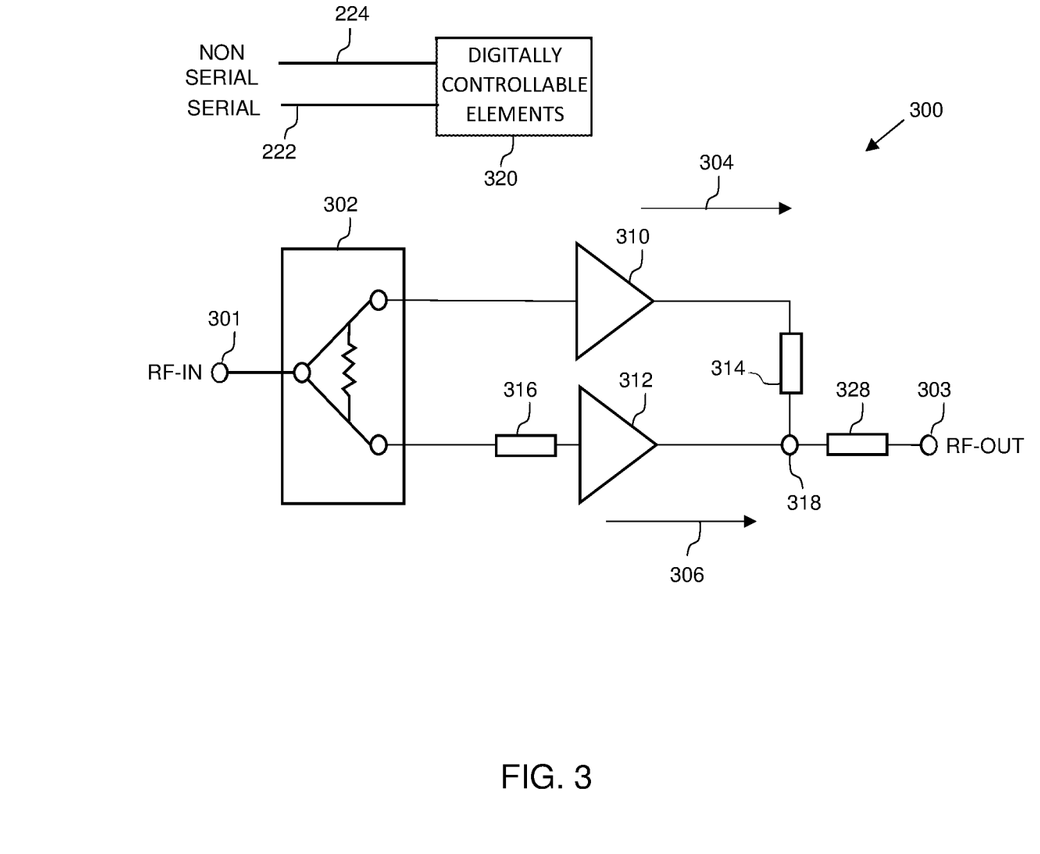
FIG. 3 shows a block diagram of a Doherty power amplifier with digitally controllable elements, in accordance with an example embodiment.

FIG. 3 shows a block diagram of a Doherty power amplifier with digitally controllable elements, in accordance with an example embodiment. As shown in FIG. 3, Doherty amplifier 300 (e.g., amplifier module 265, FIG. 2) includes an RF input terminal 301, a power splitter 302, a carrier amplifier path 304, a peaking amplifier path 306, a summing node 318, one or more digitally controllable element(s) 320, and an RF output terminal 303. The power splitter 302 is coupled both to the carrier amplifier path 304 and to the peaking amplifier path 306, and is configured to divide an input signal (RF-IN) received at RF input terminal 301 into a carrier RF signal and a peaking RF signal. More specifically, the outputs of power splitter 302 are connected to carrier amplifier 310 (also referred to as a main amplifier) and to peaking amplifier 312. Impedance matching networks or circuits (not illustrated) may be included along the signal transmission paths between the outputs of power splitter 302 and the inputs to the carrier and peaking amplifiers 310, 312. To ensure proper Doherty operation, the carrier amplifier 310 along the carrier amplifier path 304 is biased to operate in Class-AB, and the peaking amplifier 312 along the peaking amplifier path 306 is biased to operate in Class-C.

In the illustrated embodiment, Doherty amplifier 300 has a "non-inverted" Doherty configuration, in which an impedance inverter and/or a λ/4 (90 degree) phase shift element 314 is connected between the output of carrier amplifier 310 and the summing node 318. The output of peaking amplifier 312 also is connected to the summing node 318. The phase shift introduced by element 314 is, in some implementations, compensated by a 90 degree relative phase shift present on path 306 introduced by phase shift element 316, which is present between the power splitter 302 and the input to the peaking amplifier 312. In an alternate embodiment, amplifier 300 may have an "inverted" Doherty configuration. In such a configuration, the impedance inverter and/or λ/4 line phase shift element 314 instead is connected between the output of peaking amplifier 312 and the summing node 318, rather than being connected between the output of carrier amplifier 310 and the summing node 318. In addition, in an inverted Doherty implementation, the phase shift introduced by element 314 between the output of the peaking amplifier 312 and the summing node 318 can be compensated by a 90 degree relative phase shift present on path 304 (e.g., between power splitter 302 and the input to the carrier amplifier 310), rather than on path 306. An impedance transformation network 328 between summing node 318 and the amplifier output 303 functions to present the proper load impedances to each of carrier amplifier 310 and peaking amplifier 312, and outputs the combined signal produced at summing node 318 to the output terminal 303 as an output signal (RF-OUT). The output signal, RF-OUT, in turn, may be provided to an antenna (e.g., antenna 253, FIG. 2), for radiation over the air interface.

In the embodiment of FIG. 3, digitally controllable elements 320 may be coupled to control circuit elements within Doherty amplifier 300. For example, digitally controllable elements 320 may influence or modify the operation of impedance matching circuits, biasing circuits, switches, variable capacitors, etc. A more detailed example of digitally controllable elements in a Doherty power amplifier is discussed below with reference to FIG. 4.

Figure 4:
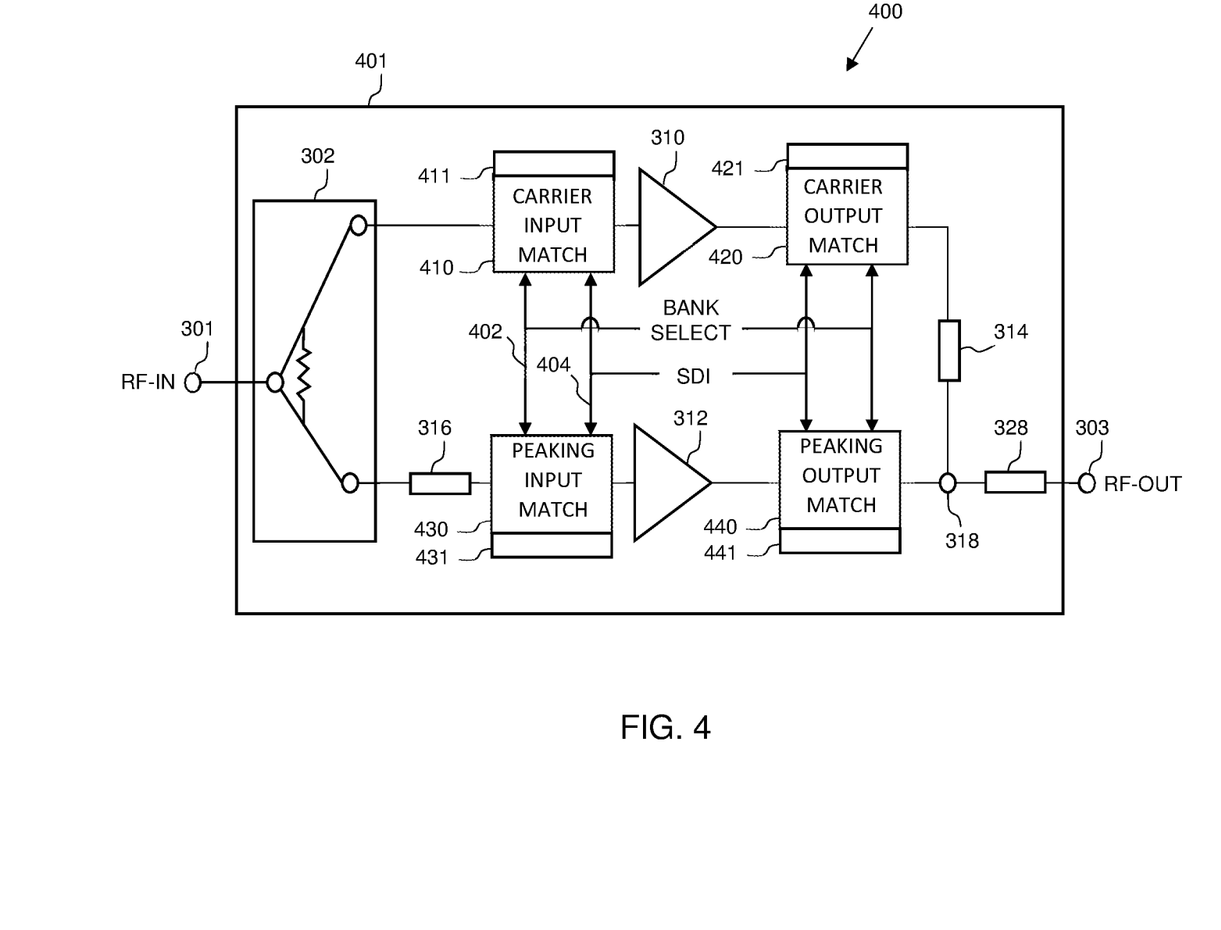
FIG. 4 shows a block diagram of a Doherty power amplifier with multiple digitally controllable elements, in accordance with an example embodiment.

FIG. 4 shows a block diagram of a Doherty power amplifier with multiple digitally controllable elements, in accordance with an example embodiment. Doherty amplifier 400 receives signals from a serial digital interface (SDI) 404 and a non-serial digital interface (Bank Select) 402 (collectively "digital control interface"). In embodiments represented by FIG. 4, SDI 404 is an example embodiment of serial interface 222 (FIG. 3), and Bank Select 402 is an example embodiment of non-serial interface 224 (FIG. 3). Both SDI 404 and Bank Select 402 are coupled in parallel to digitally controllable elements 411, 421, 431, 441 within impedance matching circuits 410, 420, 430, and 440. As shown in FIG. 4, digitally controllable elements 411, 421, 431, 441 within impedance matching circuits 410, 420, 430, and 440 are example embodiments of digitally controllable elements 320 (FIG. 3). In the example of FIG. 4, digitally controllable element 411 represents a controllable element within an impedance matching circuit 410 at the input to carrier amplifier 310 ("carrier input match"), digitally controllable element 421 represents a controllable element within an impedance matching circuit 420 at the output of carrier amplifier 310 ("carrier output match"), digitally controllable element 431 represents a controllable element within an impedance matching circuit 430 at the input to peaking amplifier 312 ("peaking input match"), and digitally controllable element 441 represents a controllable element within an impedance matching circuit 440 at the output of peaking amplifier 312 ("peaking output match").

As an example, and not by way of limitation, one or more of impedance matching circuits 410, 420, 430, and 440 may include a T network with two inductors in series between the network input/output (e.g., between the splitter and the amp), and a shunt capacitor coupled to a node between the two inductors. In these embodiments, the digitally controllable elements may include a digitally variable shunt capacitor, and/or switches to control which inductors are included within the impedance circuit.

In some embodiments, digitally controllable elements are included to influence other the operation of different parts of Doherty amplifier 400. For example, in some embodiments, bias points of amplifiers 310, 312 may be modified using digitally controllable elements. Also for example, digitally controllable impedance matching networks may be included at the RF input 301 and/or the RF output 303. In still further embodiments, one or more digitally controllable elements may be included to influence the input RF power level at which the peaking amplifier begins to conduct.

In some embodiments, Doherty amplifier 400 may support two (or more) tuneable states (e.g., corresponding to two different frequency bands) so that operational state of the amplifier may be quickly switched between the two tuning states using a single input pin (e.g., bank select 402). In this example, each of digitally controllable elements 411, 421, 431, 441 includes or accesses two bank registers which are used to set the tuning levels for each tuning state. The first tuning state may correspond to a first configuration for the four impedance matching circuits 410, 420, 430, 440, and the second tuning state may correspond to a second configuration for the four impedance matching circuits 410, 420, 430, 440. When the amplifier is operating in one tuning state, which utilizes tuning information ("tuning values") within the first bank registers ("current bank registers"), the second bank registers for the other state can be modified by writing new values to them through the digital control interface. Once the amplifier changes to operation in the other tuning state, the newly modified tuning values will be applied. Alternatively, the current bank registers can be written to through the digital control interface, in which case the change will take effect immediately.

In some embodiments, all of the components illustrated in FIG. 4 may be mounted on a module substrate 401 (e.g., a printed circuit board "PCB"), which may then be mounted to a system PCB. In these embodiments, a single serial interface between the module substrate and the system PCB may be used to communicate the information that is to be written to/read from the registers in the digitally controllable elements.

Figures 5A, 5B, 5C:
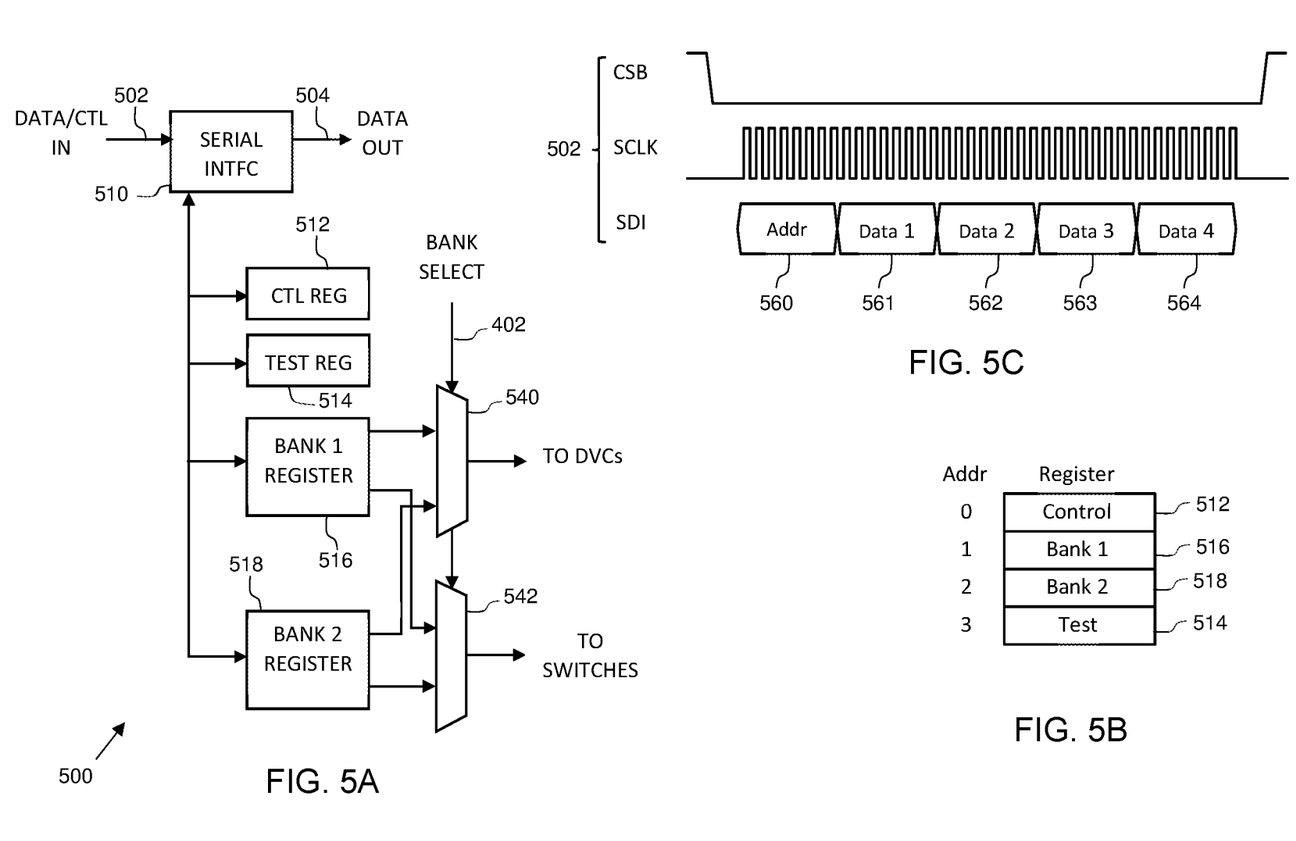
FIG. 5A shows a block diagram of a digitally controllable element, in accordance with an example embodiment.
FIG. 5B shows an address map of the digitally controllable element of FIG. 5A, in accordance with an example embodiment.
FIG. 5C shows a timing diagram of a write operation to the digitally controllable element of FIG. 5A, in accordance with an example embodiment.

FIG. 5A shows a block diagram of a digitally controllable element, in accordance with an example embodiment. Digitally controllable element 500 may be used to implement any of the digitally controllable elements described herein. For example, in some embodiments, digitally controllable element 500 may be used to implement any of elements 320 (FIG. 3) or elements 411, 421, 431, or 441.

Digitally controllable element 500 includes serial interface circuit 510, control register 512, test register 514, bank 1 register 516, bank 2 register 518, and multiplexers 540 and 542. In some embodiments, digitally controllable element 500 also includes one or more digital variable capacitors and/or or passive circuits with transistors that switch in/out circuit elements (e.g., the circuit elements controlled by multiplexers 540 and 542. Serial interface circuit 510 is coupled to a serial interface represented in FIG. 5 as DATA/CTL IN on node 502 and DATA OUT on node 504. The serial interface may take any form. For example, in some embodiments, the serial interface may be a three-wire serial interface and in other embodiments, the serial interface may be a four-wire serial interface. In general, the various embodiments are not limited by the type of serial interface employed.

In the example of FIG. 5A, digitally controllable element 500 supports two tuneable states of a tuneable element (e.g., a variable component or configurable circuit) in an amplifier. For example, bank 1 register 516 may store a first digital word that specifies a first tuneable state, and bank 2 register 518 may store a second digital word that specifies a second tuneable state. Each of the first and second digital words may encode, for example, a tuneable element value (or control values corresponding to a tuneable element value) and/or a switch state indicator. The bank select signal on node 402 may cause multiplexers 540, 542 to configure the tuneable element into either of two tuneable states by passing the contents of either bank 1 register 516 or bank 2 register 518 to the outputs of the multiplexers 540, 542. In some embodiments, the output of multiplexer 540 controls one or more digitally variable capacitors, and the output of multiplexer 542 controls one or more switches that are coupled to add or remove circuit elements from an amplifier circuit. For example, one or more capacitors, inductors or resistors may be coupled to, or decoupled from, a tuning circuit based on the output of multiplexer 542. Control register 512 and test register 514 may be used for any purpose, and in some embodiments, they are omitted.

FIG. 5B shows an address map of the registers 512, 514, 516, 518 within digitally controllable element 500 of FIG. 5A, in accordance with an example embodiment. For example, data that is presented sequentially on a serial interface (e.g., DATA/CTL IN node 502) may be written sequentially to the registers within the digitally controllable element. Similarly, during a read operation, the digitally controllable element may present the contents of the registers sequentially on a serial interface (e.g., DATA OUT node 504) in response to a read command.

FIG. 5C shows a timing diagram of a write operation to the digitally controllable element of FIG. 5A, in accordance with an example embodiment. FIG. 5C shows a chip select signal CSB, a serial clock signal SCLK, and a serial data input signal SDI, all of which are parts of DATA/CTL IN 502. In operation, when the CSB signal is asserted (low), the serial interface 510 will decode the first byte 560 (or any word size) of serial data as an address. In some embodiments, the first byte 560 also specifies a command. For example, the first byte 560 may specify a read or a write command in addition to an address corresponding to a digitally addressable element. When the first byte 560 includes an address that matches the address assigned to a register 512, 514, 516, 518 within element 500, serial interface 510 performs an action. For example, when a write command is decoded from the first byte 560, and the first byte 560 also indicates an address that maps to one of the registers 512, 514, 516, 518, serial interface 510 receives additional serial data (e.g., bytes 561, 562, 563, 564) presented sequentially on the serial interface (DATA/CTL IN node 502) and writes to the internal registers 512, 514, 516, 518, starting at the address encoded in the first byte 560. In the example of FIGS. 5B and 5C, for example, assuming that the first byte 560 indicates address 0, Data 1 561 is written to address 0 (control register 512), Data 2 562 is written to address 1 (bank 1 register 516), Data 3 563 is written to address 2 (bank 2 register 518), and Data 4 564 is written to address 3 (test register 514). A tuneable state may then be indicated by the bank select signal on node 402.

In some embodiments, serial interface 510 includes additional decoding circuitry to enable interleaving the register address map shown in FIG. 5B with the register address maps of other digitally controllable devices (e.g., additional instances of device 500). For example, when multiple digitally controllable elements are included in an amplifier module and coupled in parallel to the serial interface, data presented sequentially may be written to registers in multiple digitally controllable elements. These and other embodiments are further described below.

Figure 6A:
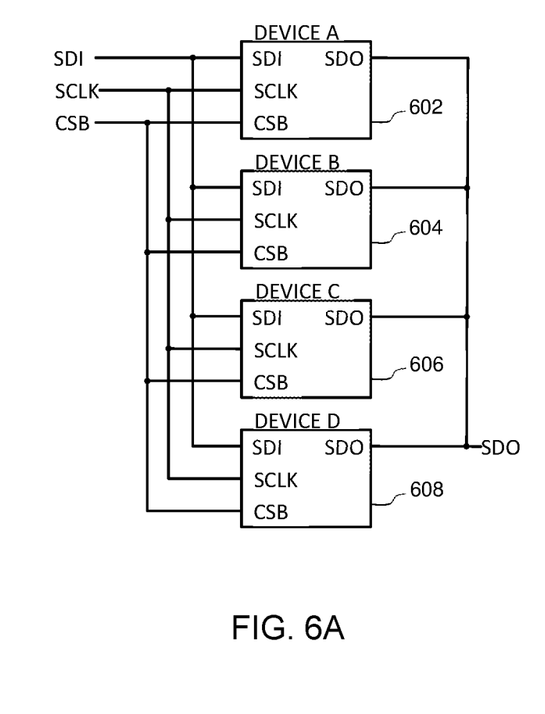
FIG. 6A shows a block diagram of multiple interconnected digitally controllable elements, in accordance with an example embodiment.

FIG. 6A shows a block diagram of multiple interconnected digitally controllable elements, in accordance with an example embodiment. In the example of FIG. 6A, digitally controllable elements 602, 604, 606, 608 (e.g., four instances of digitally controllable element 500) are coupled in parallel to a serial interface that includes signals SDI, SDO, CSB, and SCLK. In some embodiments, the four digitally controllable elements of FIG. 6A may correspond to four digitally controllable elements in a power amplifier module. For example, element 602 may correspond to element 411 (FIG. 4), element 604 may correspond to element 421 (FIG. 4), element 606 may correspond to element 431 (FIG. 4), and element 608 may correspond to element 441 (FIG. 4). Each element 602, 604, 606, 608 may include a same type of tuneable element (e.g., a tuneable capacitor or configurable circuit), or elements 602, 604, 606, 608 may include different types of tuneable elements.

Figure 6B:
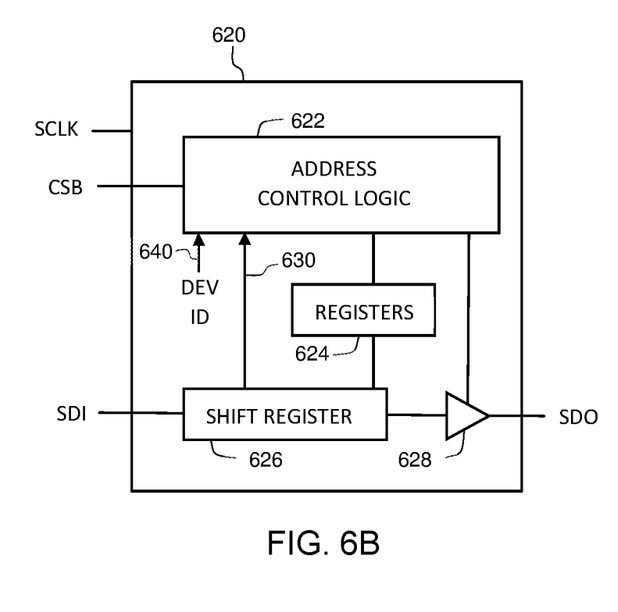
FIG. 6B shows a block diagram of a digitally controllable element, in accordance with an example embodiment.

FIG. 6B shows a block diagram of a digitally controllable element, in accordance with an example embodiment. Digitally controllable element 620 may implement any of the digitally controllable elements described herein, including elements 320 (FIG. 3), 410, 420, 430, 440 (FIG. 4), 500 (FIG. 5A), and 602, 604, 606, 608 (FIG. 6). Element 620 includes address control logic 622, registers 624, shift register 626, and output buffer 628. Element 620 may also include variable circuit elements (e.g., digitally variable capacitors) and passive circuits such as switches as described above.

Figure 7A:
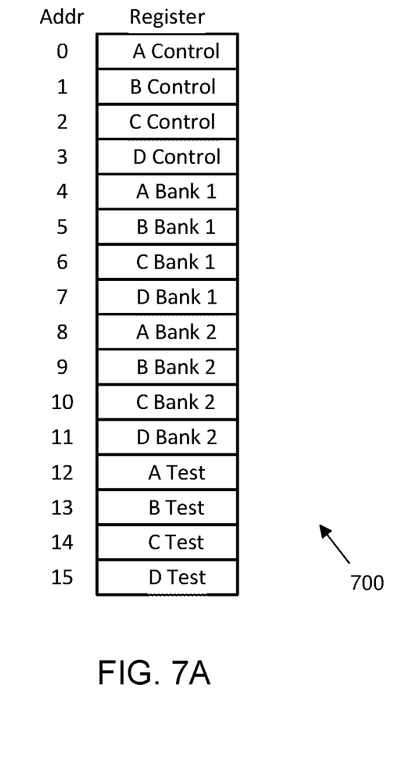
FIG. 7A shows an address map of the multiple interconnected digitally controllable elements of FIG. 6A, in accordance with an example embodiment.

In operation, serial data present on a serial data in (SDI) line is received at (i.e., clocked into) shift register 626 during a write operation, and data from registers 624 is presented as serial data on serial data out (SDO) via shift register 626 during a read operation. Address control logic 622 receives the chip select signal CSB and decodes the address and operation (e.g., read or write) from the first byte (e.g., byte 560, FIG. 5C) received from the shift register through connection 630. Address control logic 622 also receives a device identifier (DEV ID) at input 640. During a write operation, and in response to the address and the DEV ID, address control logic 622 may or may not write to registers 624 in accordance with an interleaved register accessing sequence wherein the physical registers 624 in the various elements (e.g., 602, 604, 606, 608) are interleaved in a logical register writing sequence. This is illustrated in FIG. 7A where the bank 1 registers from different digitally controllable elements are logically grouped together, the bank 2 registers are grouped together, the control registers are grouped together, and the test registers are grouped together. FIG. 7A is described in more detail below.

In the example of FIG. 6B, the DEV ID is hard coded within digitally controllable element 620, and each of the digitally controllable elements 602, 604, 606, 608 has a different DEV ID value. In these embodiments, each of the digitally controllable elements 602, 604, 606, 608 (e.g., elements included within an amplifier module) includes a mechanism to store or otherwise specify the DEV ID. In some embodiments, each of the digitally controllable elements may include a slightly different silicon design to accommodate different DEV IDs.

In various embodiments, the address control logic 622 may include one or more state machines and digital logic to perform the operations described herein. For example, address control logic 622 may include a counter that is loaded with the address value clocked in through the shift register 626, and the counter may be incremented each SCLK cycle. A decoder circuit may then decode the counter state along with the DEV ID to determine which (if any) registers within the current digitally controllable element are being addressed (e.g., written to or read from). This address decoding logic enables each digitally controllable element 602, 604, 606, 608 to keep track of which register is being accessed during each clock cycle of the serial transaction. The read/write action of each transaction cycle is gated by the address decoding logic so that although the action is sent to all of the digitally controllable elements 602, 604, 606, 608 coupled in parallel to the serial interface, only the element or elements that use that particular register address perform the action. The use of the DEV ID allows the same address decoding logic to be used in all of the digitally controllable elements 602, 604, 606, 608.

FIG. 7A shows an address map of the multiple interconnected digitally controllable elements 602, 604, 606, 608 of FIG. 6A, in accordance with an example embodiment. Register address map 700 shows an example interleaved register address map presented by multiple digitally addressable elements that are coupled in parallel to a serial interface, such as elements 602, 604, 606, 608 (FIG. 6A). As further explained below, address control logic within each element decodes an element specific device identifier and an address presented on the serial data interface to determine the configuration of the interleaved register address map. For convenience of description and illustration, a first digitally controllable element (e.g., element 602) is designated as device "A," a second digitally controllable element (e.g., element 604) is designated as device "B," a third digitally controllable element (e.g., element 606) is designated as device "C," and a fourth digitally controllable element (e.g., element 608) is designated as device "D." In the interleaved address map 700, physical writeable registers of the same type or location (e.g., Control, Bank 1, Bank 2, and Test) in the multiple digitally controllable elements are logically grouped together in a writing sequence such that a serial writing order of each of the writeable registers in an element is interleaved with a serial writing order of writeable registers in other elements.

As an example, bank 1 registers from four different digitally controllable elements A, B, C, and D (A Bank 1, B Bank 1, C Bank 1, D Bank 1) are logically grouped in the register address map and are addressed in sequential order (e.g., as addresses 4-7), even though they correspond to physical registers in different devices. Similarly, bank 2 registers from four different digitally controllable elements A, B, C, and D (A Bank 2, B Bank 2, C Bank 2, D Bank2) are logically grouped in the register address map and are addressed in sequential order (e.g., as addresses 8-11). Accordingly, the writing order of bank 1 registers from different digitally controllable elements are interleaved, and the writing order of bank 2 registers from different digitally controllable elements are interleaved, in order to create the interleaved register address map 700. This allows a sequential, serial write operation to bank 1 registers in all of the digitally controllable registers without disturbing (e.g., overwriting) the contents of the other registers within the digitally controlled elements (e.g., bank 2, test, and control registers). Similarly, this allows a sequential, serial write operation to bank 2 registers in all of the digitally controllable registers without disturbing (e.g., overwriting) the contents of the other registers within the digitally controlled elements (e.g., bank 1, test, and control registers). An example write operation is illustrated in FIG. 7B.

Figure 7B:
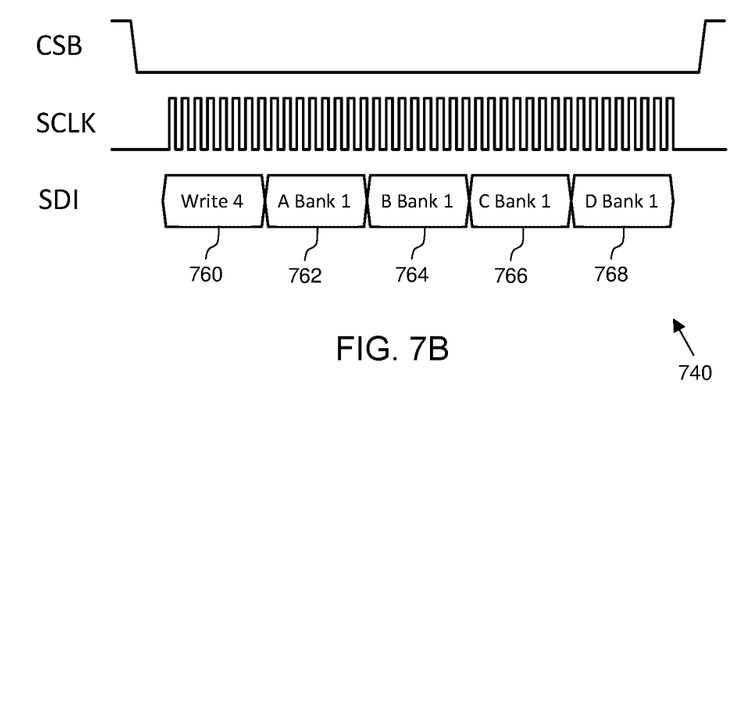
FIG. 7B shows a timing diagram of a write operation to the multiple interconnected digitally controllable elements of FIG. 7A, in accordance with an example embodiment.

FIG. 7B shows a timing diagram of a write operation to the multiple interconnected digitally controllable elements of FIG. 7A, in accordance with an example embodiment. The write operation 740 illustrated in FIG. 7B demonstrates writing to bank 1 registers in elements 602, 604, 606, 608 (FIG. 6A) according to the interleaved register address map 700 (FIG. 7A). A write operation to address 4 "write 4" is presented as the first byte 760 on the serial data input SDI line of the serial interface. This is received (at shift register 626) and decoded (by address control logic 622) by all four digitally controllable elements 602, 604, 606, 608. The address control logic within each element decodes the write 4 along with the element specific DEV ID, and the element that includes the register mapped in the register address map 700 to address 4 (element 602, DEVICE A) performs the first write. Accordingly, when presented as the second byte 762 on the serial data input SDI line of the serial interface, the serial data in byte 762 is written to the bank 1 register of device A (element 602). Then the address within each element is incremented by the address control logic (in this example to address "5"). The address control logic within each element then decodes the incremented address value of 5 along with the element specific DEV ID, and, according to the register address map 700, the element that includes the register at address 5 (element 604, DEVICE B) performs the next write into its bank 1 register. Accordingly, the serial data in byte 764 is written to the bank 1 register of device B (element 604). In a similar manner, the serial data in subsequently received byte 766 is written to the bank 1 register of device C (element 606), and the serial data in subsequently received byte 768 is written to the bank 1 register of device D (element 608).

As illustrated in FIGS. 7A and 7B, multiple digitally controllable elements coupled in parallel to a serial data interface are configured to present an interleaved register address map to the serial data interface in response to a unique device identifier assigned to each of the multiple digitally controllable elements. Although FIG. 7B illustrates a write operation to a single bank of interleaved registers, the various embodiments described herein are not limited in this respect. For example, in some embodiments, write operations span banks such that multiple banks are written in a single write operation. Also for example, in some embodiments, test and control registers are contiguous in the interleaved register address map, and single write operation may update the contents of all test and control registers in all digitally controllable elements without disturbing the contents of any of the bank 1 registers or bank 2 registers.

Read operations may be performed in a similar manner. For example, during a read operation, the write 4 in byte 760 may instead be a "read 9" (or a read of another register address), and each digitally controllable register will decode the address along with the element's specific DEV ID to determine which register contents are to be presented on the SDO output, in this instance resulting in the bank 2 register contents being read from multiple digitally controllable elements in a sequence according to the interleaved register map shown at 700 (FIG. 7A).

Figure 8A:
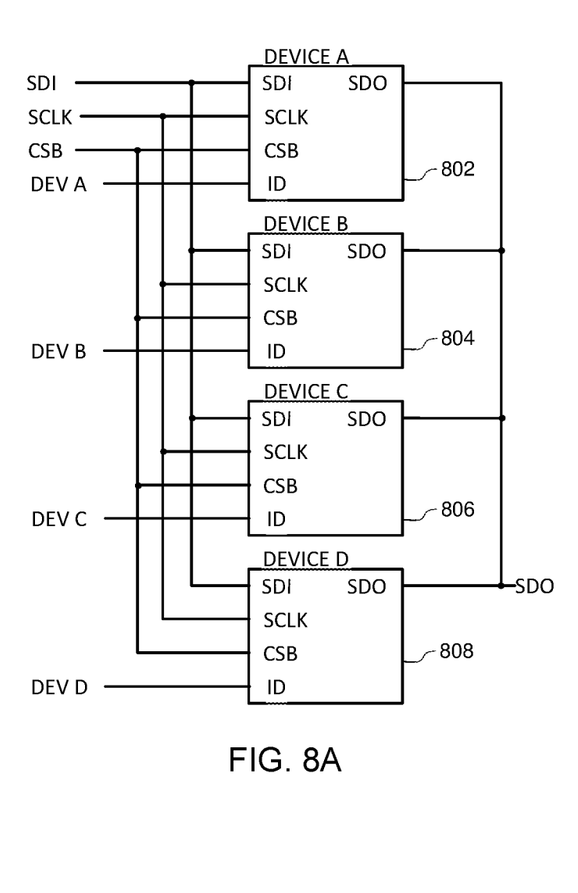
FIG. 8A shows a block diagram of multiple interconnected digitally controllable elements, in accordance with an example embodiment.

FIG. 8A shows a block diagram of multiple interconnected digitally controllable elements, in accordance with an example embodiment. In the example of FIG. 8A, digitally controllable elements 802, 804, 806, 808 (e.g., four instances of digitally controllable element 500) are coupled in parallel to a serial interface that includes signals SDI, SDO, CSB, and SCLK. In some embodiments, the four digitally controllable elements of FIG. 8A may correspond to four digitally controllable elements in a power amplifier module. For example, element 802 may correspond to element 411 (FIG. 4), element 804 may correspond to element 421 (FIG. 4), element 806 may correspond to element 431 (FIG. 4), and element 808 may correspond to element 441 (FIG. 4). Each element 802, 804, 806, 808 may include a same type of tuneable element (e.g., a tuneable capacitor or configurable circuit), or elements 802, 804, 806, 808 may include different types of tuneable elements In embodiments represented by FIG. 8A, each of the digitally controllable elements also receives an element specific DEV ID. For example, element 802 receives a DEV ID having a value of DEV A, element 804 receives a DEV ID having a value of DEV B, element 806 receives a DEV ID having a value of DEV C, and element 808 receives a DEV ID having a value of DEV D. The element specific DEV ID values may be any values that the address control logic within the addressable elements can decode to determine the interleaved register address map. For example, the DEV A value may be zero, the DEV B value may be four, the DEV C value may be eight, and the DEV C value may be twelve.

Figure 8B:
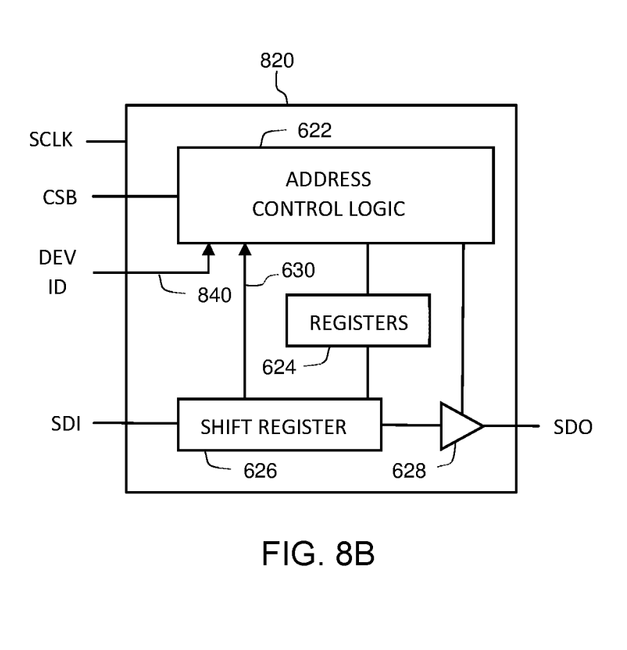
FIG. 8B shows a block diagram of a digitally controllable element, in accordance with an example embodiment.

FIG. 8B shows a block diagram of a digitally controllable element, in accordance with an example embodiment. Digitally controllable element 820 may implement any of the digitally controllable elements described herein, including elements 320 (FIG. 3), 410, 420, 430, 440 (FIG. 4), 500 (FIG. 5A), and 602, 604, 606, 608 (FIG. 6). Element 820 includes address control logic 622, registers 624, shift register 626, and output buffer 628, all of which are described above with reference to FIG. 6B. Element 620 may also include variable circuit elements (e.g., digitally variable capacitors) and passive circuits such as switches as described above.

In the example of FIG. 8B, the DEV ID is not hard coded within digitally controllable element 820. In these embodiments, each of the digitally controllable elements included within an amplifier module includes an additional DEV ID input, through which each element receives the element's specific DEV ID from an external node 840. In these embodiments, each of the digitally controllable elements may be implemented using identical silicon designs, allowing any number of identical parts to be utilized within an amplifier module. In some embodiments, the element specific DEV IDs are specified by coupling multiple individual circuit traces within node 840 to logic levels when a digitally controllable element is placed in an amplifier module. For example, in some embodiments, node 840 may include four individual circuit traces, allowing for 16 different DEV ID values. DEV A may be set to zero (0001), DEV B may be set to four (0100), DEV C may be set to eight (1000), and DEV D may set to twelve (1100). As another example, in some embodiments, node 840 may include only two individual circuit traces, allowing for 4 different DEV ID values. DEV A may be set to zero (00), DEV B may be set to one (01), DEV C may be set to two (10), and DEV D may set to three (11). These DEV ID values are presented as examples only, and the various embodiments are not limited in this respect.

Figure 9:
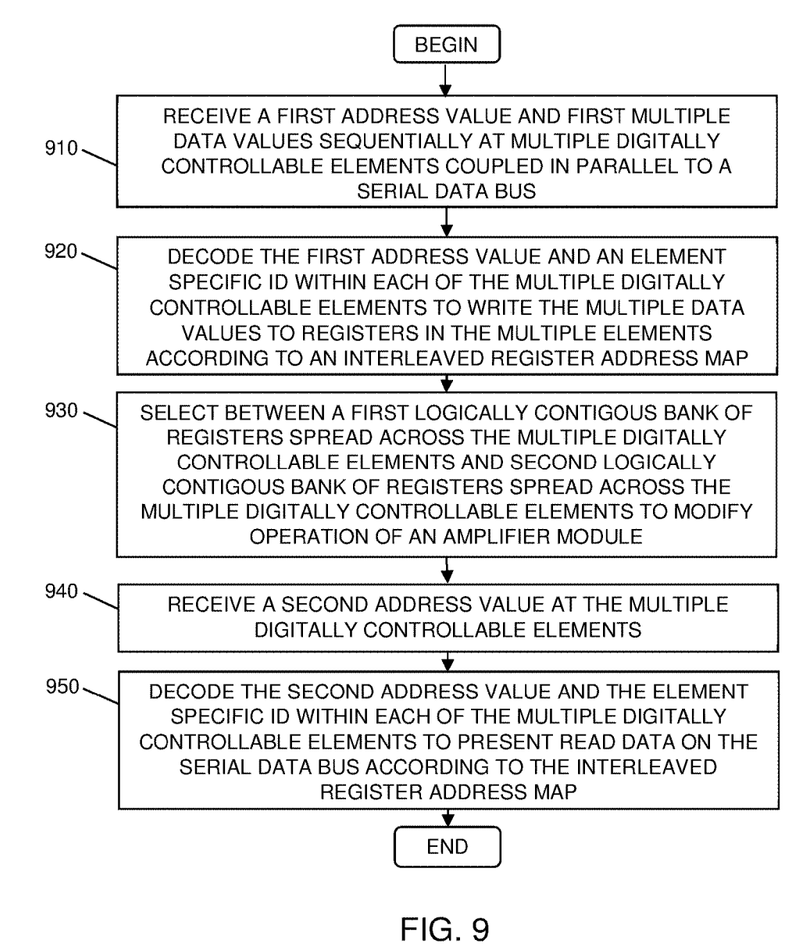
FIG. 9 is a flowchart illustrating methods, in accordance with various embodiments.

FIG. 9 is a flowchart illustrating methods, in accordance with various embodiments. In block 910, a first address value and first multiple data values are received sequentially at multiple digital controllable elements that are coupled in parallel to a serial data interface. An example of the operations of block 910 is illustrated in FIG. 7B in which a first byte having an operation/address value "write 4" is received by multiple elements (e.g., elements 602, 604, 606, 608, FIG. 6A; or elements 802, 804, 806, 808, FIG. 8A) coupled in parallel to a serial data interface (e.g., CSB, SCLK, SDI, SDO). The byte containing the operation/address value is followed sequentially by bytes containing multiple data values 762, 764, 766, 768 (FIG. 7B).

In block 920, the first address value and an element specific ID within each of the digitally controllable elements (or provided from an external source) are decoded to write the multiple data values to registers in the multiple elements (or to read multiple data values from the registers, depending on whether the operation is write or read) according to an interleaved register address map. In one example of the operations of block 920 (e.g., when the first byte specifies "write 4"), each of the digitally controllable elements may decode the write operation starting at address four and write to the bank 1 registers at addresses 4, 5, 6, and 7 in interleaved register map 700 in sequential order even though the physical registers corresponding to these addresses are physically located in different digitally addressable elements. In another example of the operations of block 920, multiple banks of registers within the multiple elements may be written. For example, the first address value of "write 4" may be followed by eight sequential data values, in which case both bank 1 registers and bank 2 registers will be written according to the interleaved register map 700.

In block 930, a selection is made between multiple (e.g., first and second) logically contiguous banks of registers (e.g., bank 1 and bank 2) to influence or modify the operation of an amplifier module (e.g., to set the values of tunable elements or circuit configurations according to the values in the bank 1 registers or the bank 2 registers). The multiple logically contiguous banks of registers may be spread across multiple digitally controllable elements. In an example of the operations of block 930, a bank select signal (e.g., bank select 402, FIG. 5A) may select one of bank 1 registers or bank 2 registers to select a tunable state of an amplifier module (e.g., amplifier module 265, FIG. 2). In some embodiments, the operations of blocks 910 and 920 are repeated to effect a write operation in one bank of registers while a different bank of registers is selected in block 930. For example, a typical sequence may include 1) write both banks of registers in a single write operation (blocks 910, 920), 2) select bank 1 to put an amplifier module in a first tunable state associated with bank 1 (block 930), 3) while the amplifier module is operating in the first tunable state, write to bank 2 (repeat blocks 910, 920) without disturbing bank 1 and without disturbing the amplifier operation in the first tunable state, and 4) subsequently selecting bank 2 to put the amplifier module in a second tunable state (repeat block 930). The aforementioned sequence is provided as an example only, and the various embodiments described herein support a myriad of different writing and selecting sequences.

In an alternate embodiment, the operations of blocks 910 and 920 may be repeated to effect a write operation in one bank of registers while that same bank of registers is selected in block 930. For example, a typical sequence may include 1) write both banks of registers in a single write operation (blocks 910, 920), 2) select bank 1 to put an amplifier module in a first tunable state associated with bank 1 (block 930), and 3) while the amplifier module is operating in the first tunable state, overwrite the registers of bank 1 (repeat blocks 910, 920).

In block 940, a second address value corresponding to a read operation is received in parallel at the multiple digitally controllable elements (as described above in conjunction with block 910), and in block 950, the second address value is decoded at the multiple digitally controllable elements (as described above in conjunction with block 920). The second address value is decoded along with the element's specific ID of each element to determine which registers are being addressed. The register contents of the appropriate registers are then presented in sequence on the serial interface in accordance with the interleaved register address map.

The above-described embodiments relate to a system that is configurable into two states (e.g., an amplifier that is configurable to operate in two different frequency bands), where "Bank 1" pertains to settings associated with a first state, and "Bank 2" pertains to settings associated with a second state. In other embodiments, the system may be configurable into more than two states, and accordingly, additional registers associated with additional states may be interleaved and grouped together in the address map (e.g., Bank 3, Bank 4, and so on).

An embodiment of a communication system includes a plurality of digitally controllable elements communicatively coupled in parallel to a serial data interface, wherein each digitally controllable element of the plurality of digitally controllable elements includes a plurality of writeable registers, and further includes an address control circuit. The address control circuit is configured to receive an address value from the serial data interface, receive a plurality of data values from the serial data interface, and write at least one of the plurality of data values to at least one of the plurality of writeable registers in accordance with an interleaved register accessing sequence in which a serial writing order of the plurality of writeable registers is interleaved with a serial writing order of writeable registers in other digitally controllable elements of the plurality of digitally controllable elements.

According to a further embodiment of the system, the plurality of digitally controllable elements are coupled to be responsive a common chip select signal within the serial data interface. According to a further embodiment, the address control circuit is configured to determine the interleaved register accessing sequence responsive to a unique device identifier assigned to each digitally controllable element of the plurality of digitally controllable elements. According to yet another further embodiment of the system, the unique device identifier is hard-coded within each digitally controllable element of the plurality of digitally controllable elements. According to yet another further embodiment of the system, each digitally controllable element of the plurality of digitally controllable elements includes an input node to receive the unique device identifier. According to a further embodiment, the address value specifies a write operation, and the address control circuit is configured to decode the write operation from the address value. According to another further embodiment, the address control circuit is further configured to receive a second address value from the serial data interface and present contents of at least one of the plurality of writeable registers on the serial data interface in accordance with the interleaved register accessing sequence. According to another further embodiment, the plurality of writeable registers within each digitally controllable element are organized into a plurality of banks, and wherein each digitally controllable element is responsive to a bank select signal to select one of the plurality of banks. According to a further embodiment, contents of a selected bank of the plurality of writeable registers are coupled to control at least one digitally variable capacitor. According to a further embodiment, contents of a selected bank of the plurality of writeable registers are coupled to control at least one variable impedance circuit within an amplifier module.

According to another further embodiment the amplifier module includes a Doherty power amplifier with a carrier amplifier path and a peaking amplifier path, the Doherty power amplifier includes a power splitter configured to divide the RF input signal into a carrier RF signal and a peaking RF signal, the digitally controllable elements include one or more variable capacitors and/or switches coupled to inductors coupled to either or both of the carrier amplifier path and the peaking amplifier path, and the digitally controllable elements are configured to modify operation of the amplifier by modifying impedances within the amplifier module.

An embodiment of a power amplifier module includes an RF input node, an RF output node, a serial data interface, at least one amplifier to amplify an input signal on the RF input node and produce an output signal on the RF output node, and a plurality of digitally controllable elements coupled to modify operation of the at least one amplifier, the plurality of digitally controllable elements being coupled in parallel to the serial data interface, wherein the plurality of digitally controllable elements are configured to present an interleaved register address map to the serial data interface in response to a unique device identifier assigned to each of the plurality of digitally controllable elements.

According to a further embodiment of the system, the at least one amplifier includes a Doherty power amplifier with a carrier amplifier path and a peaking amplifier path, and the plurality of digitally controllable elements include one or more variable impedance circuits coupled to either or both of the carrier amplifier path and the peaking amplifier path. According to a further embodiment, each of the plurality of digitally controllable elements includes physical registers, and the interleaved register address map includes a plurality of logically contiguous banks of registers, wherein each logically contiguous bank of registers of the plurality of logically contiguous banks of registers includes physical registers in each of the plurality of digitally controllable elements. According to yet another further embodiment of the system, the amplifier module includes a bank select input node coupled to select one of the logically contiguous banks of registers to modify operation of the at least one amplifier. According to yet another further embodiment of the system, the plurality of digitally controllable elements include programmable impedance circuits.

An embodiment of a method performed by a communication system includes writing to a first bank of registers in a power amplifier module by specifying a first address value and first data values sequentially on a serial data interface, wherein the first bank of registers are physically located in a plurality of digitally controllable elements within the power amplifier module. The method further includes writing to a second bank of registers in the power amplifier module by specifying a second address value and second data values sequentially on the serial data interface, wherein the second bank of registers are physically located in the plurality of digitally controllable elements within the power amplifier module. The method further includes selecting between the first bank of registers and the second bank of registers to modify operation of the power amplifier module.

According to a further embodiment, the method may further include writing to the first bank of registers when the second bank of registers are selected. The method may further include amplifying the RF input signal, by a power amplifier that includes a sub-circuit that is controllable based on the control signal produced by the control circuit. The method may further include writing to the second bank of registers when the first bank of registers are selected. According to another further embodiment of the method, selecting between the first bank of registers and the second bank of registers to modify operation of the power amplifier module includes selecting between two states of impedance matching circuits.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system comprising:
    a plurality of digitally controllable elements communicatively coupled in parallel to a serial data interface, wherein each digitally controllable element of the plurality of digitally controllable elements includes a plurality of writeable registers, and further includes an address control circuit configured to
    receive a first byte including an address value from the serial data interface;
    receive a plurality of data values from the serial data interface; and
    write at least one of the plurality of data values to at least one of the plurality of writeable registers in accordance with an interleaved register accessing sequence in which a serial writing order of the plurality of writeable registers is interleaved with a serial writing order of writeable registers in other digitally controllable elements of the plurality of digitally controllable elements.

2. The system of claim 1, wherein the plurality of digitally controllable elements are coupled to be responsive to a common chip select signal within the serial data interface.

3. The system of claim 1, wherein the address control circuit is configured to determine the interleaved register accessing sequence responsive to a unique device identifier assigned to each digitally controllable element of the plurality of digitally controllable elements.

4. The system of claim 3, wherein the unique device identifier is hard-coded within each digitally controllable element of the plurality of digitally controllable elements.

5. The system of claim 3, wherein each digitally controllable element of the plurality of digitally controllable elements includes an input node to receive the unique device identifier.

6. The system of claim 1, wherein the first byte specifies a write operation, and the address control circuit is configured to decode the write operation from the address value.

7. The system of claim 6, wherein the address control circuit is further configured to:
    receive a second byte that specifies a second address value and specifies a read operation from the serial data interface; and
    present contents of at least one of the plurality of writeable registers on the serial data interface in accordance with the interleaved register accessing sequence.

8. The system of claim 1 wherein the plurality of writeable registers within each digitally controllable element are organized into a plurality of banks, and wherein each digitally controllable element is responsive to a bank select signal to select one of the plurality of banks.

9. The system of claim 8 wherein contents of a selected bank of the plurality of writeable registers are coupled to control at least one digitally variable capacitor.

10. The system of claim 8 wherein contents of a selected bank of the plurality of writeable registers are coupled to control at least one switch.

11. The system of claim 8 wherein contents of a selected bank of the plurality of writeable registers are coupled to control at least one component value of a variable impedance circuit within an amplifier module.

12. A power amplifier module comprising:
    an RF input node;
    an RF output node;
    a serial data interface;
    at least one amplifier to amplify an input signal on the RF input node and produce an output signal on the RF output node; and
    a plurality of digitally controllable elements coupled to modify operation of the at least one amplifier, the plurality of digitally controllable elements being coupled in parallel to the serial data interface, wherein the plurality of digitally controllable elements are configured to present an interleaved register address map to the serial data interface in response to a unique device identifier assigned to each of the plurality of digitally controllable elements.

13. The power amplifier module of claim 12, wherein:
    the at least one amplifier comprises a Doherty power amplifier with a carrier amplifier path and a peaking amplifier path; and
    the plurality of digitally controllable elements comprises one or more components of one or more variable impedance circuits coupled to either or both of the carrier amplifier path and the peaking amplifier path.

14. The power amplifier module of claim 12, wherein each of the plurality of digitally controllable elements includes physical registers, and the interleaved register address map includes a plurality of logically contiguous banks of registers, wherein each logically contiguous bank of registers of the plurality of logically contiguous banks of registers comprises physical registers in each of the plurality of digitally controllable elements.

15. The power amplifier module of claim 14, further comprising a bank select input node coupled to select one of the logically contiguous banks of registers to modify operation of the at least one amplifier.

16. The power amplifier module of claim 12, wherein the plurality of digitally controllable elements comprises one or more components of one or more variable impedance circuits.

17. A method performed by an electronic system, the method comprising:
   writing to a first bank of registers in a power amplifier module by specifying a first address value and first data values sequentially on a serial data interface, wherein the first bank of registers are physically located in a plurality of digitally controllable elements within the power amplifier module;
   writing to a second bank of registers in the power amplifier module by specifying a second address value and second data values sequentially on the serial data interface, wherein the second bank of registers are physically located in the plurality of digitally controllable elements within the power amplifier module; and
   selecting between the first bank of registers and the second bank of registers to modify operation of the power amplifier module.

18. The method of claim 17, wherein the selecting comprises selecting between two states of an impedance matching circuit.

19. The method of claim 17, further comprising writing to the first bank of registers when the second bank of registers are selected.

20. The method of claim 19, further comprising writing to the second bank of registers when the first bank of registers are selected.

* * * * *